United States Patent
Mikajiri

(10) Patent No.: US 8,736,896 B2
(45) Date of Patent: May 27, 2014

(54) OPTICAL SCANNING UNIT AND IMAGE FORMING APPARATUS INCLUDING A BEAM SPLITTER FOR ADJUSTING LIGHT INTENSITY OF A LIGHT SOURCE

(75) Inventor: Susumu Mikajiri, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 575 days.

(21) Appl. No.: 13/113,435

(22) Filed: May 23, 2011

(65) Prior Publication Data

US 2011/0292467 A1  Dec. 1, 2011

(30) Foreign Application Priority Data

May 27, 2010 (JP) ................................. 2010-121457

(51) Int. Cl.
*G06K 15/12* (2006.01)

(52) U.S. Cl.
USPC ............ 358/1.7; 358/509; 358/504; 358/483; 358/481; 359/489.08; 359/578; 359/583; 359/584; 359/585; 347/261; 347/224; 347/225; 347/231; 347/233; 347/246; 347/130; 347/252; 347/253

(58) Field of Classification Search
CPC ..................................................... G02B 26/123
USPC .......................... 358/509, 504, 1.7, 483, 481; 359/489.08, 578, 583–585; 347/261, 347/224, 225, 231, 233, 246, 130, 252, 253
See application file for complete search history.

(56) References Cited

U.S. PATENT DOCUMENTS

| 4,195,316 A | 3/1980 | Sansome |
| 2004/0057098 A1* | 3/2004 | Kashimura ................... 359/216 |
| 2004/0184127 A1* | 9/2004 | Nakajima et al. ............. 359/204 |
| 2007/0253047 A1 | 11/2007 | Ichii et al. |

(Continued)

FOREIGN PATENT DOCUMENTS

| CN | 1484062 A | 3/2004 |
| CN | 101261365 A | 9/2008 |

(Continued)

OTHER PUBLICATIONS

Combined Office Action & Search Report issued Apr. 3, 2013 in Chinese Application No. 201110132278.0.

(Continued)

*Primary Examiner* — Benny Q Tieu
*Assistant Examiner* — Quyen V Ngo
(74) *Attorney, Agent, or Firm* — Oblon, Spivak, McClelland, Maier & Neustadt, L.L.P.

(57) ABSTRACT

An optical scanning unit includes a light source including a plurality of light-emitting elements; a light detector to detect a light beam emitted from the light source; a light-flux splitter, angled to the optical axis of the light beam emitted from the light source, having an aperture, a portion of reduced thickness susceptible to warping, a concave face of the warped light-flux splitter as a reflecting face, and a convex face of the warped light-flux splitter opposite the concave face as a non-reflecting face; and a light-flux splitter pressing unit to press the light-flux splitter onto a light-flux splitter holding member without blocking the aperture. Light beam passed the aperture is used as a write-use light flux. The reflecting face reflects a light flux other than the write-use light flux as a monitor-use light flux. The light-flux splitter pressing unit presses a portion of maximum convexity of the non-reflecting face.

14 Claims, 13 Drawing Sheets

(56) References Cited

U.S. PATENT DOCUMENTS

| | | |
|---|---|---|
| 2008/0218827 A1* | 9/2008 | Watanabe et al. ............ 359/204 |
| 2008/0292342 A1 | 11/2008 | Yamashita |
| 2009/0052944 A1 | 2/2009 | Kubo et al. |
| 2010/0060710 A1* | 3/2010 | Kubo ............................ 347/224 |
| 2010/0060963 A1 | 3/2010 | Miyake et al. |
| 2010/0231816 A1 | 9/2010 | Mikajiri |

FOREIGN PATENT DOCUMENTS

| | | |
|---|---|---|
| EP | 1 995 641 A2 | 11/2008 |
| EP | 1 995 641 A3 | 11/2008 |
| JP | 8-106039 | 4/1996 |
| JP | 4146177 | 6/2008 |
| JP | 2009-47924 | 3/2009 |
| JP | 2009-276591 | 11/2009 |

OTHER PUBLICATIONS

Extended Search Report issued Sep. 6, 2011 in European Patent Application No. 11167126.9-2217.

* cited by examiner

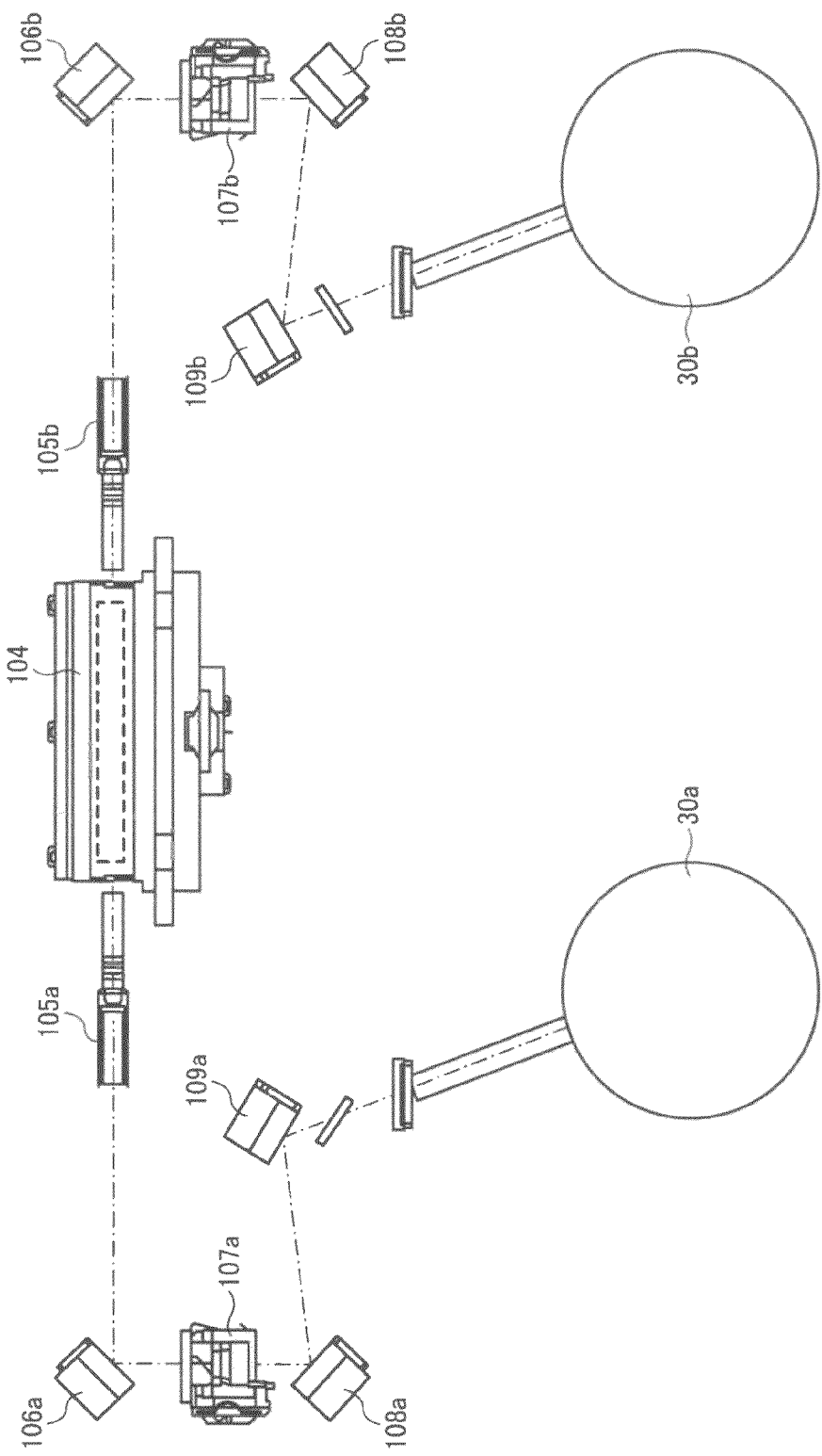

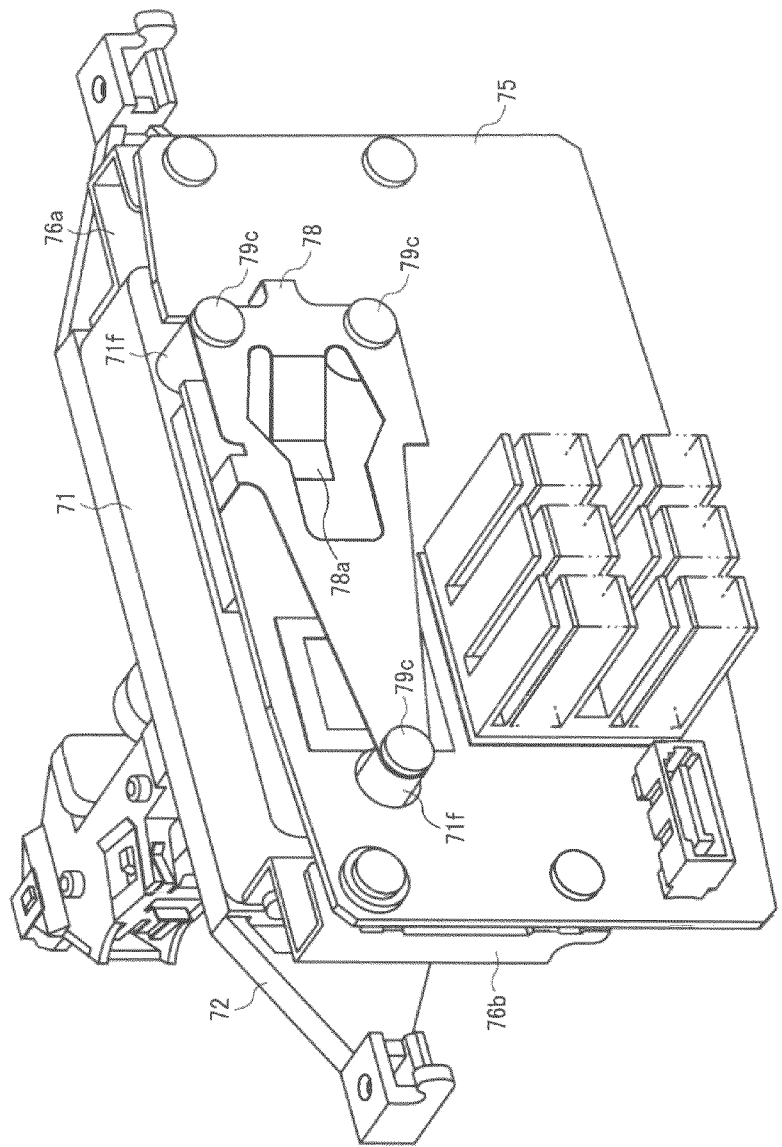

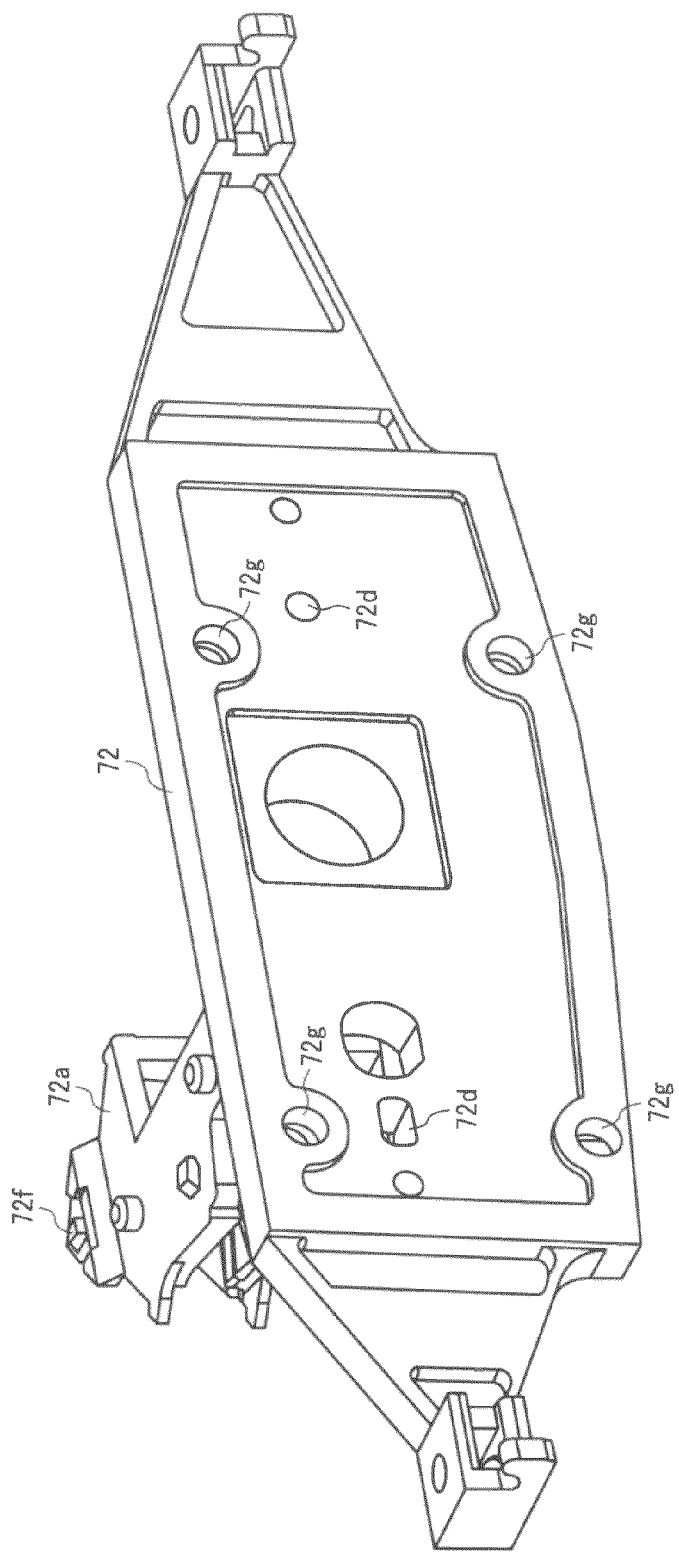

OPTICAL SCANNING UNIT AND IMAGE FORMING APPARATUS INCLUDING A BEAM SPLITTER FOR ADJUSTING LIGHT INTENSITY OF A LIGHT SOURCE

CROSS-REFERENCE TO RELATED APPLICATIONS

This application claims priority to Japanese Patent Application No. 2010-121457, filed on May 27, 2010 in the Japan Patent Office, which is incorporated by reference herein in its entirety.

BACKGROUND OF THE INVENTION

1. Field of the Invention

The present invention relates to an optical scanning unit usable for forming an electrostatic latent image on a surface of an image bearing member such as a photoconductor, and more particularly to an optical scanning unit usable for a multi-beam scanning system having a light source unit including a plurality of light-emitting elements to simultaneously scan using a plurality of light beams for forming images at a high speed, and an image forming apparatus using electrophotography such as a printer, a facsimile machine, a copier, or a multi-functional apparatus having at least two functions of these and employing the optical scanning unit.

2. Description of the Background Art

In image forming apparatuses using electrophotography, light beams emitted from a light source unit are deflected by a rotatable multi-face mirror such as a polygon mirror, and the deflected light beams are focused on an image bearing member such as a photoconductor via optical elements such as a focus lens, a reflecting mirror, or the like to form a desired electrostatic latent image on the image bearing member.

Further, a portion of the light beams deflected by the rotatable multi-face mirror is separated and extracted by the reflecting mirror or the like, and then the separated light beams enter a light detector so that an electrical trigger signal for detecting a scan start signal and a scan end signal are output. In such a configuration, a reflecting mirror for separating and extracting a portion of the light beams may be a glass-based optical member. Further, JP-H08-106039-A discloses a technique using a metal block having received specular working, which corresponds to a reflecting mirror made from a glass-based member.

As more and more multi-color image forming apparatuses have come to be equipped with high speed printing capabilities, and more and more image forming apparatuses have come to be used as on-demand printing systems, users have been demanding more precise imaging from the image printing system. In light of such trend, JP-2009-47924-A discloses an image forming apparatus using a two-dimensional surface-emission laser array such as a vertical cavity surface emitting laser (VCSEL) configured with a plurality of light-emitting sources, in which a plurality of light beams is used to scan an image bearing member simultaneously to form a plurality of lines of an electrostatic latent image simultaneously, which may be referred to as a multi-beam scanning system. Such multi-beam scanning system disclosed in JP-2009-47924-A can be devised as a prominent technology for an optical scanning unit that can form more precise images at a high speed.

In general, image forming apparatuses may employ various types of light sources such as the above-mentioned two-dimensional surface-emission laser array having a plurality of light-emitting elements or a conventional single light-emitting source such as an edge-emission laser. However, regardless of type of light source, the intensity of the light flux emitted from the light source may fluctuate due to temperature changes or simply aging, and thereby fluctuation may occur in the density of images output by the image forming apparatus.

To reduce the fluctuation of light intensity of light flux, in an optical scanning unit using a conventional edge-emission laser, a light beam emitted rearward of the light source may be monitored to adjust the light intensity of light source automatically, which is known as auto power control (APC control). However, in the multi-beam scanning system, the above-mentioned two-dimensional surface-emission laser array having a plurality of light-emitting elements does not emit light beams rearward of the light-emitting elements due to its inherent configuration. Therefore, a portion of the light flux emitted as light flux for forming a latent image may be separated and extracted at a light path, and such extracted light is further reflected and guided to a light detector such as a photodiode for use as a monitor. Then, the APC control may be conducted using light intensity of the monitor-use light flux received by the light detector.

Such APC control can be conducted by using the metal block having received specular working (as disclosed in JP-H08-106039-A) or by using a conventional glass-based optical member to extract a trigger signal. However, the metal block having received specular working needs a specular working process, which increases manufacturing costs. Similarly, in the case of using a conventional glass-based optical member as reflecting mirror, a plurality of reflecting mirrors and a prism may be required to extract and reflect a portion of the light flux, emitted from a light source, to a light detector disposed at a given position, which also increases manufacturing costs as well as the size of apparatus. As market demand has shifted to lower-cost machines, such configuration may not be cost-effective.

In JP-2009-47924-A, a light-flux splitter is disposed, in which the light-flux splitter has an aperture having a diameter smaller than the light flux coming from a light source such as two-dimensional surface-emission laser array. The light-flux splitter has a reflecting face having higher luminescence and faces the light source, while the reflecting face is angled with respect to an optical axis to a given angle such as 45 degrees. In such a configuration, the light flux passing through the aperture of light-flux splitter strikes a rotatable multi-face mirror such as a polygon mirror to form an electrostatic latent image on an image bearing member.

Further, any light flux not passing through the aperture of light-flux splitter (hereinafter surrounding light beam) is reflected by the reflecting face of light-flux splitter and further reflected by a convergent lens and a reflecting mirror toward a circuit board having the light source. A light detector disposed on the circuit board detects the light intensity of the surrounding light beam, and based on the detected light intensity of the surrounding light beam, APC control can be implemented.

In such a configuration detecting the light intensity of light beam from a light source, the APC control can be implemented with a relatively lower cost. However, as described above, users seek more precise images, and to produce those more precise images, the APC control needs to be conducted more precisely or strictly. Accordingly, the surrounding light beams extracted from the light-flux splitter needs to be detected more precisely to conduct the APC control more precisely.

When a two-dimensional surface-emission laser array such as a VCSEL is used as a light source, a portion of a plurality of light beams emitting from a light source having a plurality of light-emitting elements strikes a light detector. A beam spot diameter of the light beams coming from all light sources needs to be a desired size when the light beams enter the light detector. Such desired beam spot diameter may be determined in view of an assembly configuration and assembly precision of the light-flux splitter.

Further, to conduct the APC control more precisely, it is preferable that the light beams, reflected by the light-flux splitter and entering the light detector, are not mixed with other disturbance light as much as possible. Because the light-flux splitter angled with respect to the optical axis of the light flux coming from the light source, a portion of the light beam passing through the aperture of light-flux splitter may be reflected at a thicker part of light-flux splitter and may interfere with the monitor-use reflected light beams guided to the light detector.

Accordingly, the light-flux splitter is preferably configured as thin as possible to reduce disturbance light reflected at the thicker part of light-flux splitter. However, the thinner the light-flux splitter, the more warping occurs for the light-flux splitter during manufacture. If the light-flux splitter is used without correcting such warping, light beams may not be reflected at the light-flux splitter with a desired reflection angle, and APC control precision may deteriorate.

SUMMARY

In one aspect of the invention, an optical scanning unit is devised. The optical scanning unit includes: a light source including a plurality of light-emitting elements; a light detector to detect a light beam emitted from the light source; a light-flux splitter disposed at an angle to the optical axis of the light beam emitted from the light source, having an aperture, a portion of reduced thickness susceptible to warping, a concave face of the warped light-flux splitter as a reflecting face, and a convex face of the warped light-flux splitter opposite the concave face as a non-reflecting face; a light-flux splitter holding member to hold the light-flux splitter thereon; and a light-flux splitter pressing unit to press the light-flux splitter held on the light-flux splitter holding member without blocking the aperture of the light-flux splitter. A portion of light beam emitted from the light source passes through the aperture of the light-flux splitter as a write-use light flux for forming an electrostatic latent image on an image bearing member. The reflecting face of the light-flux splitter faces the light source in an optical path of the light beam emitted from the light source. The reflecting face of light-flux splitter reflects a light flux other than the write-use light flux as a monitor-use light flux for adjusting a light intensity of the light source, the monitor-use light flux is guided to the light detector. The light-flux splitter pressing unit presses a portion of maximum convexity of the non-reflecting face of the light-flux splitter held on the light-flux splitter holding member.

In another aspect of the invention, a light source unit useable for an optical scanning unit is devised. The light source unit includes a light source having a plurality of light-emitting elements; a light detector to detect light emitted from the light source; a circuit base to support the light source and the light detector; at least one optical element to convert light beam emitting from the light source as a parallel light flux, a divergent light flux, or a convergent light flux; an optical element holder to hold the at least optical element to convert the light beam; a light-flux splitter disposed at an angle to the optical axis of the light beam emitted from the light source, having an aperture, a portion of reduced thickness susceptible to warping, a concave face of the warped light-flux splitter as a reflecting face, and a convex face of the warped light-flux splitter opposite the concave face as a non-reflecting face; a light-flux splitter holding member to hold the light-flux splitter thereon; and a light-flux splitter pressing unit to press the light-flux splitter held on the light-flux splitter holding member without interfering with the aperture of light-flux splitter. A portion of light beam emitted from the light source passes through the aperture of the light-flux splitter as a write-use light flux for forming an electrostatic latent image on an image bearing member. The reflecting face of the light-flux splitter faces the light source in an optical path of the light beam emitted from the light source. The reflecting face of light-flux splitter reflects a light flux other than the write-use light flux as a monitor-use light flux for adjusting a light intensity of the light source, the monitor-use light flux is guided to the light detector. The light-flux splitter pressing unit presses a portion of maximum convexity of the non-reflecting face of the light-flux splitter held on the light-flux splitter holding member.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 shows a schematic cross-sectional view of the optical scanning unit of FIG. 2;

FIG. 4 shows a perspective view of exterior of a light source unit according an example embodiment, in which

FIG. 8 shows a schematic perspective view of an intervening holder, in which

FIG. 9 shows a schematic perspective view of circuit base viewed from its rear side when the intervening holder and the circuit base are connected each other;

FIG. 10 shows a schematic perspective view of the optical element holder viewed from the intervening holder;

Figure 1:
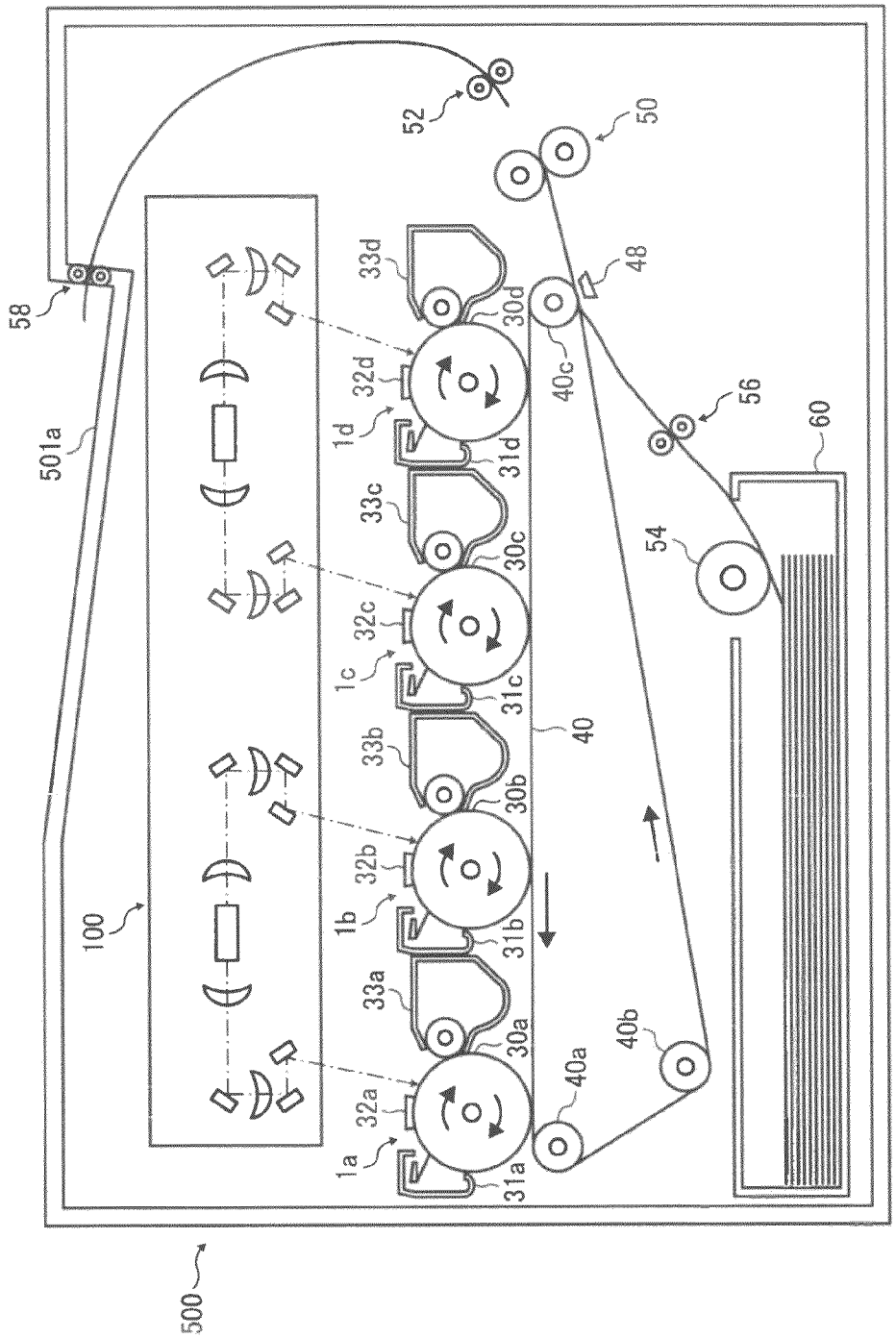
FIG. 1 shows a schematic cross-sectional view of an example image forming apparatus employing an optical scanning unit according an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner. Referring now to the drawings, an image forming apparatus according to example embodiment is described hereinafter.

A description is given of an example configuration of an image forming apparatus 500 employing an optical scanning unit 100 according to an example embodiment with reference to FIG. 1 showing a schematic cross-sectional view of the image forming apparatus 500, which may be, for example, a full-color printer, but not limited thereto. The image forming apparatus 500 may include an optical scanning unit 100, and a light source unit 200 as described later. The light source unit 200 may include an optical configuration or system to guide a monitor-use light flux to a light detector as described later.

The image forming apparatus 500 using electrophotography includes an image forming section. The image forming section may include a plurality of image forming units 1a, 1b, 1c, and 1d. Each of the image forming units 1a, 1b, 1c, and 1d has a same configuration except color of toner used for image forming, and the image forming units 1a, 1b, 1c, and 1d may respectively form, for example, black toner image, magenta toner image, cyan toner image, and yellow toner image. Because the image forming units 1a, 1b, 1c, and 1d have a same configuration except the color of development agent such as toner, the suffix letters a, b, c, and d may be omitted in the following description.

The image forming unit 1 may include a photoconductor 30 used as an image bearing member such as a photoconductor drum surrounded by a charger 32, a development unit 33, and a cleaning unit 31 disposed around the photoconductor 30. The photoconductor 30 may rotate in the clockwise direction, and a surface of the rotating photoconductor 30 can be uniformly charged at a given potential by applying a given bias voltage to the charger 32. The charger 32 may be a non-contact type charger using a corona discharge, but the charger 32 may be a contact type charger such as a roll charger that can contact the photoconductor 30.

Further, the image forming apparatus 500 may include an optical scanning unit 100 above the image forming units 1. The optical scanning unit 100 may include optical components such as a light source, a rotatable multi-faced mirror (e.g., polygon mirror), a f-theta lens, a reflecting mirror, or the like. Based on image information or image data for each color of toners, the optical scanning unit 100 optically scans each of the photoconductors 30, charged by the charger 32, to form an electrostatic latent image on each of the photoconductors 30 (exposing process) based on image data corresponding to each color of toner. The electrostatic latent image formed on the photoconductor 30 using the optical scanning unit 100 comes to a position facing the development unit 33 with a rotation of the photoconductor 30, and can be developed as a visible image by transferring toner from the development unit 33.

Further, an intermediate transfer belt 40, used as an intermediate transfer member, may be disposed while facing the photoconductors 30 of the image forming units 1. The intermediate transfer belt 40, which may be an endless belt, may contact the surface of each of the photoconductors 30. The intermediate transfer belt 40 may be extended by a plurality of support rollers 40a, 40b, and 40c, in which the support roller 40b may be connected to a drive motor used as a drive source. By driving the drive motor, the intermediate transfer belt 40 can be rotated, for example, in the counter-clockwise direction in FIG. 1 as shown by an arrow, and then the support rollers 40a and 40c can be rotated with a rotation movement of the intermediate transfer belt 40. Further, a primary transfer roller is disposed at an inner face of the intermediate transfer belt 40 while opposing to the photoconductor 30 via the intermediate transfer belt 40. A high voltage power source supplies a primary transfer bias to the primary transfer roller, by which the toner image developed by the development unit 33 can be transferred onto the intermediate transfer belt 40 (primary transfer process). Toner remaining on the photoconductor 30 after the primary transfer process may be removed by a cleaning blade of the cleaning unit 31 to prepare the photoconductor 30 for a next image forming operation.

Further, the image forming apparatus 500 includes a secondary transfer device such as a secondary transfer charger 48 at a position opposing the support roller 40c via the intermediate transfer belt 40, in which the secondary transfer charger 48 is distanced from the intermediate transfer belt 40 with a given distance. The secondary transfer charger 48 is supplied with a voltage having an opposite polarity of voltage applied to the charger 32.

Further, the image forming apparatus 500 may include a sheet cassette 60 to store recording media, a sheet feed roller 54, registration rollers 56, and a fusing unit 50. The fusing unit 50 is disposed at a downstream of transportation direction of sheet from the secondary transfer charger 48. The fusing unit 50 may include a pair of rollers such as a pressure roller and a heat roller to fuse a toner image on the recording medium by applying heat and pressure to a recording medium. Further, at a downstream of sheet transportation direction from the fusing unit 50, transport rollers 52 and ejection rollers 58 may be disposed to eject the recording medium to a ejection tray 501a used as recording medium ejection unit.

A description is given of image forming operation in the image forming apparatus 500. Because the image forming units 1a, 1b, 1c, and 1d have a same configuration except the color of development agent such as toner, the suffix letters a, b, c, and d may be omitted in the following description. When the image forming unit 1 conducts an image forming operation, a toner image is formed on the photoconductor 30 and then transferred onto the intermediate belt 40.

At first, a personal computer or the like may transmit image forming signals to the image forming apparatus 500. Upon receiving the image forming signals, the photoconductor 30 starts to rotate in the clockwise direction by a drive source, a de-charger emits light onto the surface of photoconductor 30 to initialize the surface potential of photoconductor 30. The photoconductor 30 having initialized surface potential is then charged uniformly by the charger 32 to a given polarity and potential. The optical scanning unit 100 emits laser beams onto the charged surface of photoconductor 30 to form a desired electrostatic latent image on the photoconductor 30. When the optical scanning unit 100 emits laser beam to scan the photoconductor 30, the laser beam is prepared by decomposing original full color image information into information of single color image such as yellow image, cyan image, magenta image, and black toner image. The electrostatic latent image formed on the photoconductor 30 is developed as a toner image by applying toner (development agent) from the development unit 33 when the electrostatic latent image passes a position facing the development unit 33.

The intermediate transfer belt 40 may be rotated in the counter-clockwise direction in FIG. 1. The primary transfer roller is applied with a primary transfer voltage having a polarity opposite of polarity of toner image formed on the photoconductor 30. With the effect of primary transfer voltage, a primary transfer electric field is formed between the photoconductor 30 and the intermediate transfer belt 40, by which the toner image on the photoconductor 30 can be primary transferred to the intermediate transfer belt 40 rotating with a synchronized timing with the photoconductor 30. At the primary transfer process, each of the toner images is sequentially transferred to the intermediate transfer belt 40 from the upstream side of transportation direction at a given timing, and a desired full color toner image can be formed on the intermediate transfer belt 40 by superimposing the toner images.

While such image formation is being conducted, a recording medium to be formed with an image is transported from the sheet cassette 60 to a nip of the registration rollers 56. Specifically, the sheet feed roller 54 feeds recording media stacked in the sheet cassette 60 one by one to the registration rollers 56, and then a recording medium is stopped at the nip of registration rollers 56, which is not yet rotated. At the registration rollers 56, when a leading edge of the transported recording medium abuts the nip of registration rollers 56, the registration of recording medium is conducted.

Then, the registration rollers 56 are started to rotate at a timing of formation of full color toner image on the intermediate transfer belt 40, by which the recording medium is fed to the secondary transfer nip, set between the intermediate transfer belt 40 and the secondary transfer charger 48, distanced from the intermediate transfer belt 40 and opposite of the support roller 40c. The secondary transfer charger 48 is applied with a given transfer voltage, by which the full color toner image formed on the intermediate transfer belt 40 is transferred on the recording medium, and carried on the recording medium as un-fused toner image. The recording medium having the toner image is further transported to the fusing unit 50, in which heat and pressure are applied to the recording medium to fuse a full color image. The recording medium having the fused image is further transported and ejected to the ejection tray 501a by the transport rollers 52 and ejection rollers 58, by which one image forming operation completes. Toner not transferred at the secondary transfer nip but remaining on the intermediate transfer belt 40 may be removed and recovered by a belt cleaning unit.

Figure 2:
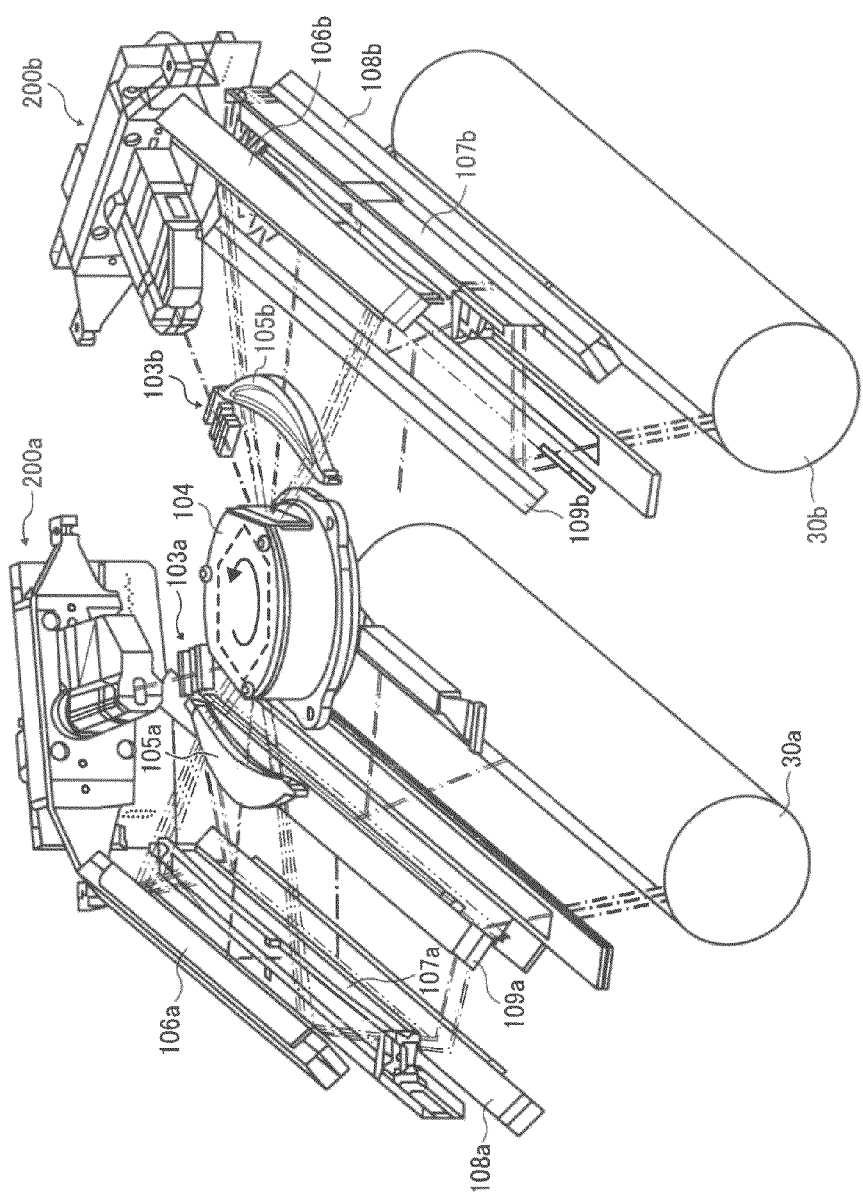
FIG. 2 shows a schematic perspective view of one example of optical scanning unit according an example embodiment.

A description is given of configuration and effect of the optical scanning unit 100 employed for the image forming apparatus 500 with reference to FIGS. 2 and 3.

FIG. 2 shows a schematic perspective view of one example of the optical scanning unit 100, and FIG. 3 shows a schematic cross-sectional view of the optical scanning unit 10 of FIG. 20. As shown in FIG. 1, the image forming apparatus 500 may include two optical scanning units such as one optical scanning unit for the photoconductors 30a and 30b, and another optical scanning unit for the photoconductors 30c and 30d. In FIGS. 2 and 3, only the optical scanning unit 100 for the photoconductors 30a and 30b is shown. Because the optical scanning unit usable for the photoconductors 30a and 30b and the optical scanning unit usable for the photoconductors 30c and 30d employ a substantially same configuration, a description is only given of the optical scanning unit 100 for the photoconductors 30a and 30b as an example of optical scanning unit.

As shown in FIGS. 2 and 3, the optical scanning unit 100 includes a deflector such as a rotatable multi-face mirror, which may be a polygon mirror 104. Further, the optical scanning unit 100 includes first scan lenses 105a and 105b, first reflecting mirrors 106a and 106b, second reflecting mirrors 108a and 108b, and third reflecting mirrors 109a and 109b in such order along a light path of light beam coming from the polygon mirror 104 to the photoconductor 30. In such configuration, the light beam emitted from a light source is guided to the photoconductor 30 along the light path shown in FIGS. 2 and 3, and the first scan lenses 105a and 105b, first reflecting mirrors 106a and 106b, second reflecting mirrors 108a and 108b, and third reflecting mirrors 109a and 109b are disposed at a downstream of the light path in such order. Further, the optical scanning unit 100 may include a second scan lens 107a (107b) between the first reflecting mirror 106a (106b) and the second reflecting mirror 108a (108b). Further, the optical scanning unit 100 may include the light source units 200a and 200b at the upstream side of the light path from the polygon mirror 104, which will be described later.

The light source units 200a and 200b are configured in a given configuration so that a light emitting from a light source disposed in the light source unit 200 can enter a deflection face of the polygon mirror 104 with a given angle. Between the light source unit 200a (200b) and the polygon mirror 104, a cylinder lens 103a (103b) is disposed along the light path. The cylinder lens 103a (103b) is used to focus the light, emitted from the light source, at a position close to the polygon mirror 104 in the sub-scanning direction. Further, the polygon mirror 104 may be, for example, a hexagonal prism shape having deflection faces for deflecting light beam at its deflection faces finished as mirror. The polygon mirror 104 can be rotated with a given angular speed in a given direction as shown by an arrow in FIG. 2 using a drive unit such as a polygon motor or the like.

The light beam, emitted from the light source units 200a and 200b and focused near the deflection face of the polygon mirror 104 via the cylinder lenses 103a and 103b, is deflected at the deflection face of polygon mirror 114, and then passes through the first scan lenses 105a and 105b, the first reflecting mirrors 106a and 106b, the second scan lenses 107a and 107b, the second reflecting mirrors 108a and 108b, and the third reflecting mirrors 109a and 109b sequentially, and then enters the writing area on the photoconductors 30a and 30b used as the image bearing member.

Further, the first scan lens 105a (105b) is used to scan the light beam deflected by the polygon mirror 104 in the main scanning direction (or axis direction) of the photoconductor 30 at a constant speed, wherein the light beam deflected by the polygon mirror 104 is at a constant angular speed.

Further, the first reflecting mirror 106a (106b) reflects the light beam passing the first scan lens 105a (105b), and guides the light beam to the second scan lens 107a (107b). The second scan lens 107a (107b) is used to focus the light beam on the surface of photoconductor 30a (30b) via the second reflecting mirror 108a (108b) and the third reflecting mirror 109a (109b). In this disclosure, light, beam, light beam, and light flux may be used interchangeably with a substantially same meaning.

As for the optical scanning unit 100, when the image forming apparatus 500 receives image forming signal from a personal computer or the like, a main controller decomposes color information of received image forming signal into information of single color image for each of toner colors, and based on the single color image information, the optical scanning unit 100 emits the light beam corresponding to single color image from the light source units 200a and 200b, and the light beam emitted from the light source unit 200 is focused near the deflection face of the polygon mirror 104 via the cylinder lenses 103a and 103b. The focused light beam is then deflected by the polygon mirror 104, and enters the first scan lenses 105a and 105b. The light beam, entering the first scan lens 105a (105b), reflects at the first reflecting mirror 106a (106b), and enters the second scan lens 107a (107b). With the effect of the second scan lens 107a (107b), the light beam entering the second scan lens 107a (107b) is focused on the photoconductor 30a (30b), used as image bearing member, via the second reflecting mirror 108a (108b) and the third reflecting mirror 109a (109b). Furthermore, the light beam focused on the photoconductor 30a (30b) may need to enter the writing area on the photoconductor 30a (30b) with a given level of light intensity to prevent an image formation failure such as uneven image concentration, wherein the light intensity may be controlled by the automatic power control (APC) as described later.

A description is given of the light source units 200a and 200b with reference to FIG. 4. The light source units 200a and 200b have a substantially same configuration, and thereby the suffix letters of "a" and "b" may be omitted in the following description.

Figure 4A:
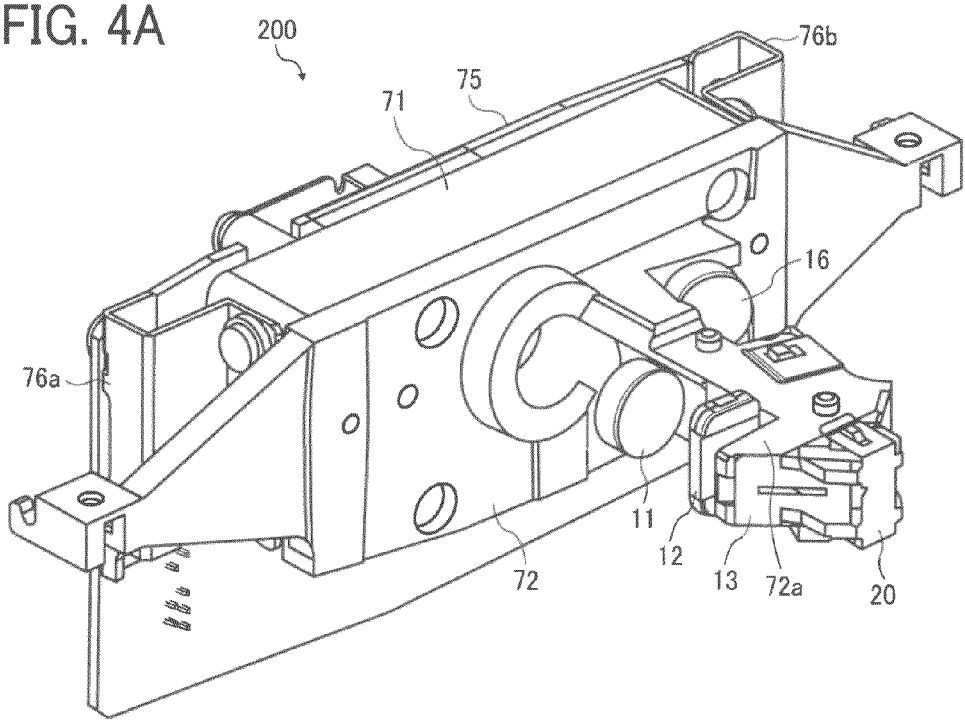
FIG. 4A shows a perspective view of the light source unit from a left front.
Figure 4B:
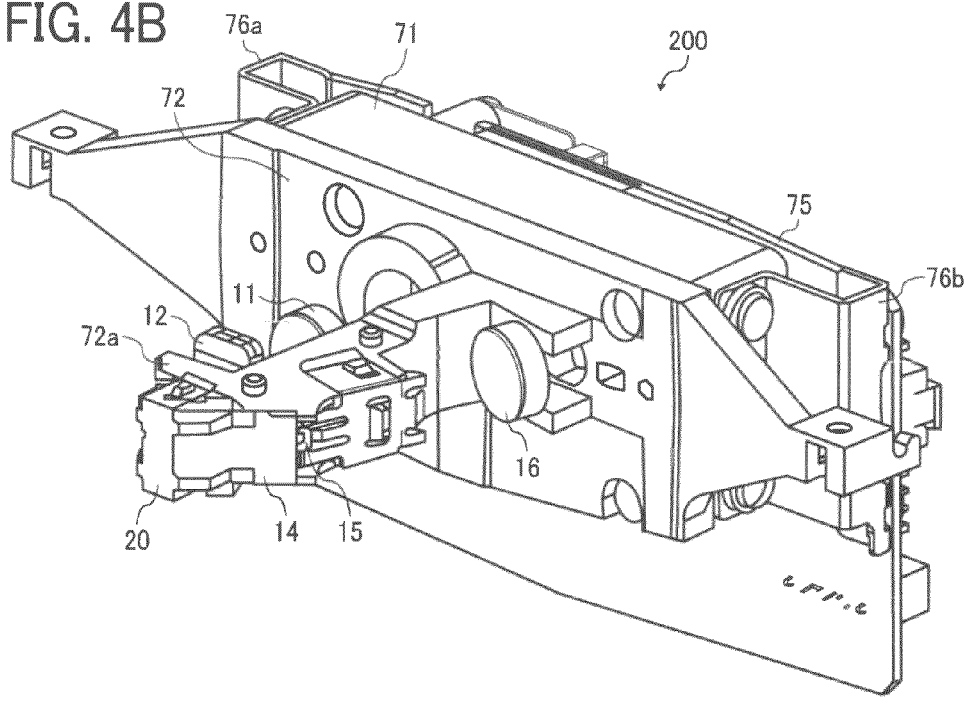
FIG. 4B shows a perspective view of the light source unit from a right front.
Figure 5:
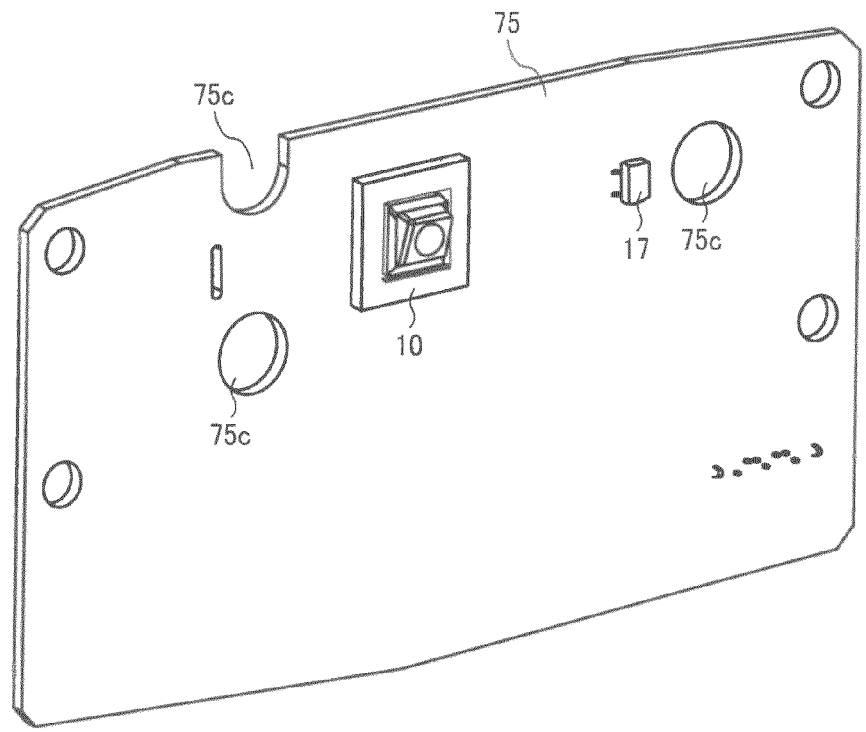
FIG. 5 shows a schematic perspective view of a circuit base.

FIG. 4 shows perspective views of the light source unit 200, in which FIG. 4A shows a perspective view of the light source unit 200 viewed from a left front side, and FIG. 4B shows a perspective view of the light source unit 200 viewed from a right front side. The light source unit 200 may include a light source device 10 and a package 10b (see FIG. 5). The light source device 10 may employ a surface light-emitting source 10a (see FIGS. 5 and 6) having a plurality of light-emitting elements. The surface light-emitting source 10a may be configured with a plurality of light-emitting elements arrayed two-dimensionally on one face, which is perpendicular to the emitting direction of light beam emit-able from the light-emitting source, and the package 10b may encase the surface light-emitting source 10a. The light source device 10 may be installed on a circuit base 75 as shown in FIG. 5.

Further, the light source unit 200 may include a coupling lens 11, a temperature-effect correcting lens 12, and an optical element holder 72. Light beam emitted from the light source device 10 becomes a parallel light flux, a converged light flux or a divergent light flux by the coupling lens 11 used as an optical element. The optical element holder 72 also holds a light-flux splitter 13, which will be described later.

Furthermore, the light source unit 200 may include an intervening holder 71 disposed between the circuit base 75 and the optical element holder 72. The intervening holder 71 may contact a portion of the surface light-emitting source 10a, installed on the circuit base 75, to fix the surface light-emitting source 10a at a given position in the light source unit 200. It should be noted that the light source device 10 and a light detector 17 are not shown in FIG. 4 because the circuit base 75 is assembled inside the light source unit 200 in FIG. 4. The light source device 10 and the light detector 17 will be described later with reference to FIG. 5 showing the circuit base 75.

The coupling lens 11 held by the optical element holder 72 may be fit in a coupling lens receiver used as a coupling lens holder in the optical element holder 72. The coupling lens 11 may have a given refractive index such as 1.5 or so, for example, to set the light beams emitted from the light source device 10 as substantially a parallel light flux, a convergent light flux, or a divergent light flux.

Further, the temperature-effect correcting lens 12, made of a translucent resin material, may be fit to a temperature-effect correcting lens receiver used as a temperature-effect correcting lens holder in the optical element holder 72. The temperature-effect correcting lens 12 has an optical property to correct fluctuation of optical property of the light source unit 200 when a minute fluctuation occurs to a distance between the coupling lens 11 and the light source device 10 due to temperature fluctuation in the light source unit 200. Further, a long side of the temperature-effect correcting lens 12 may be formed longer than a width of the coupling lens receiver, by which the temperature-effect correcting lens 12 can be clamped by an adjustment jig easily, and the adjustment can be conducted easily.

Further, the light-flux splitter 13 may be shaped as a plate such as thin plate or sheet having an aperture at a substantially center portion of the light-flux splitter 13, in which the aperture may have a rectangular shape. The light-flux splitter 13 also has a reflecting face to reflect a light beam emitting from the light source device 10, wherein the reflecting face of the light-flux splitter 13 faces to the light source device 10 (opposite side shown in FIG. 4A). Accordingly, the reflecting face formed on the light-flux splitter 13 faces to the light source device 10 at a given position in the light path of light beams emitted from the light source device 10.

Further, the light-flux splitter 13 may be attached to a light-flux splitter holding member 72a (see FIG. 11) used as a light-flux splitter holder while the center of aperture of the light-flux splitter 13 is positioned at or near the focus position of the coupling lens 11, and the reflecting face of the light-flux splitter 13 is angled to to the light path of light flux for a given angle such as for example about 45 degrees.

By configuring the optical elements 11, 12, 13 as above described, the light beam emitting from the light source device 10 passes the coupling lens 11 and the temperature-effect correcting lens 12, and some portion of the emitting light beam, to be used as a write-use light flux to form an electrostatic latent image on the photoconductor 30 used as the image bearing member, passes the aperture of the light-flux splitter 13, and other remaining light flux (i.e., light flux not to be used as write-use light flux) may be reflected on the reflecting face of the light-flux splitter 13 as the monitor-use light flux, which is used for adjustment of light intensity of the light source device 10, in which the reflected monitor-use light flux enters the light detector 17. The adjustment of light intensity of the light source device 10 will be described later.

As such, the light-flux splitter 13 may be used to split the light beams, emitting from the light source device 10 into the write-use light flux and the monitor-use light flux. Further, the size of aperture of light-flux splitter 13 may be set smaller than the diameter of light flux of the light beams emitted from the light source device 10.

Surrounding light flux, not used as the write-use light flux, does not pass the aperture of light-flux splitter 13 but reflects on the reflecting face of the light-flux splitter 13. In an example embodiment, some portion of the light beam, used as the write-use light flux to be used to form an electrostatic latent image on the photoconductor 30 (image bearing member), passes the aperture of the light-flux splitter 13, and other remaining light flux (i.e., light flux not to be used for write-use light flux) reflects on the reflecting face of the light-flux splitter 13 and then enters the light detector as the monitor-use light flux. But the configuration is not limited thereto.

Further, as shown in FIG. 4B, the optical element holder 72 holds a reflecting mirror 14, an aperture member 15, and a converging lens 16, which may be used to guide the monitor-use light flux, reflected by the reflecting face of the light-flux splitter 13, to the light detector, used for the APC control. Specifically, the optical configuration or system for the monitor-use light flux may reflect and/or guide the monitor-use light flux toward the circuit base 75. Specifically, the reflecting mirror 14 may be a plate having a reflecting face to reflect a light beam to a direction which is opposite to a side shown in FIG. 4B.

In an example embodiment shown in FIG. 4B, the reflecting face of the light-flux splitter 13 may be attached to a reflecting mirror attachment face of the optical element holder 72 while slanting the reflecting face with respect to the direction of light beam emitting from the light source device 10, for example, about 51.1 degrees.

The monitor-use light flux reflected by the reflecting face of the light-flux splitter 13 is then reflected by the reflecting mirror 14 toward the circuit base 75, and reaches the aperture member 15. The aperture member 15 may be disposed between the reflecting mirror 14 and the converging lens 16 as a light diaphragm member for the monitor-use light flux. Further, the converging lens 16 may be a single lens having a flat face and a convex face, and may be attached to a converging lens receiver in the optical element holder 72. The monitor-use light flux, reflected to the circuit base 75 by the reflecting mirror 14 via the aperture member 15 and the converging lens 16, can be focused on the light detector 17, installed in the circuit base 75, with a given beam spot diameter.

In such configured light source unit 200, the output signal of the light detector 17 can be constantly monitored. Specifically, the output signal of the light detector 17, which is an output when the monitor-use light flux enters the light detector 17, can be constantly monitored, and the light intensity control such as auto power control (APC control) can be conducted for the laser beam emitted from the light source device 10 based on the output signal of the light detector 17. In the light source unit 200, when the light detector 17 receives the monitor-use light flux, a photo-electric conversion is conducted to output a signal corresponding to the received monitor-use light flux, by which the intensity of laser beam emitted from the light source device 10 can be detected. The laser beam has a given preferable intensity level set in advance. Based on the intensity level detected by the light detector 17, an electric current to be supplied to the light source such as two-dimensional surface-emission laser array is determined so that the laser beam is emitted with a preferable intensity level set in advance. As such, the light beam emitting from the light source device 10 may be controlled in a given way such as linearly or directly so that the light intensity of light beam set in advance can be maintained while the light beam scans the photoconductor 30.

A description is given of the circuit base 75 disposed in the light source unit 200 with reference to FIG. 5, which shows a schematic perspective view of the circuit base 75 viewed from the front side. As shown in FIG. 5, the circuit base 75 is disposed with the light source device 10 and the light detector 17 at a front side and disposed with a drive circuit to drive the light source device 10 having a plurality of light-emitting elements at a back side of the circuit base 75, which is the opposite side of the front side shown in FIG. 5.

Figure 6:
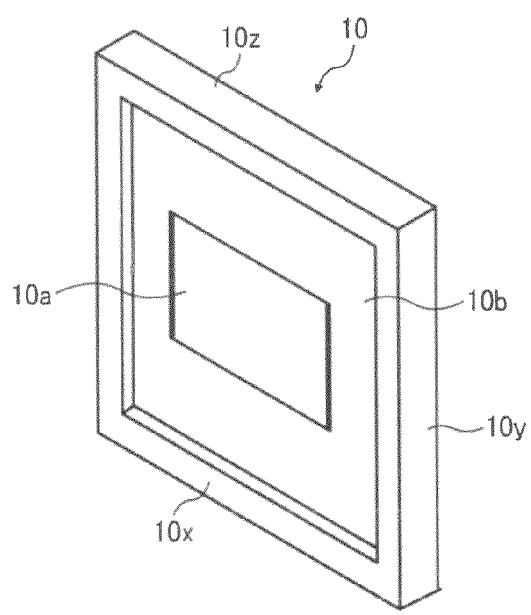
FIG. 6 shows a schematic perspective view of a light source including a plurality of light-emitting elements of FIG. 5.

FIG. 6 shows a schematic perspective view of the light source device 10 shown in FIG. 5. As shown in FIG. 6, the light source device 10 may include a package 10b having a square shape, a surface light-emitting source 10a having a plurality of light-emitting elements and encased in the package 10b, and lead terminals for wiring the surface light-emitting source 10a. As such, the light source device 10 may be a two-dimensional surface-emission laser array. The surface light-emitting source 10a such as VCSEL or the like includes a plurality of light-emitting elements arranged in two-dimensionally on an emitting face perpendicular to the direction of light beams emitting from the light-emitting elements.

The emitting face is disposed parallel to a first reference face 10x with respect to the optical axis direction of the package 10b. Further, the emitting face is encased in the package 10b while wired with the lead terminals in the package 10b. The package 10b may be, for example, a box casing, made of ceramics and attached with a glass plate, in which inert gas may be sealed. Further, in addition to the above mentioned first reference face 10x provided at a front side of the package 10b in FIG. 6, a face perpendicular to the first reference face 10x and a lateral side face shown in FIG. 6 may be used as a second reference face 10y with respect to the main scanning direction, and a face perpendicular to the first reference face 10x and a top or bottom side face shown in FIG. 6 may be used as a third reference face 10z with respect to the sub-scanning direction.

Figure 7:
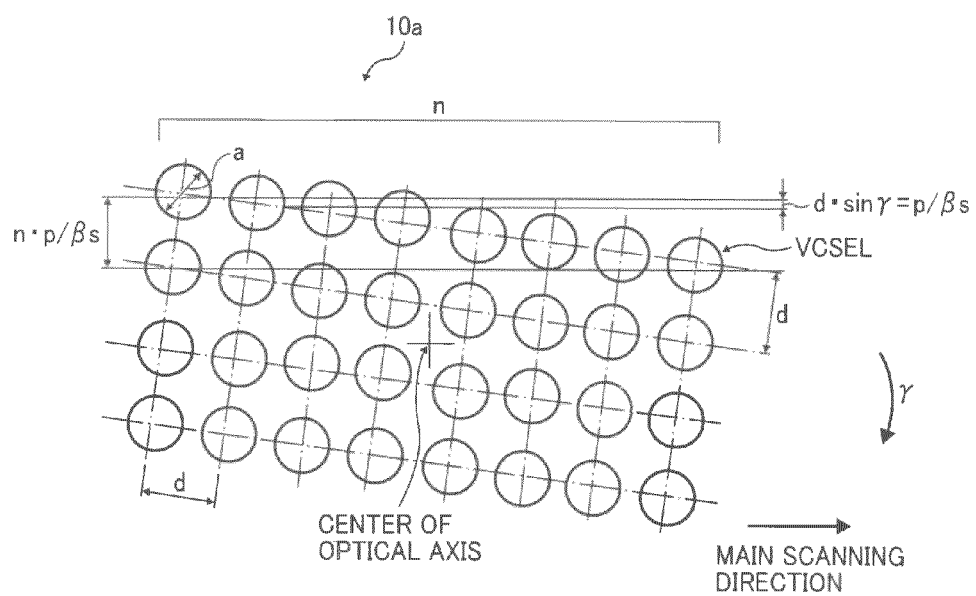
FIG. 7 shows one example arrangement of a plurality of light-emitting elements in a surface-emission light source.

Further, as shown in FIG. 7, the surface light-emitting source 10a of the light source device 10 may include light-emitting elements arranged in a matrix of "n (columns)×m (rows)" with an interval "d." For example, the surface light-emitting source 10a of the light source device 10 may include light-emitting elements arranged in a matrix of 8 (columns)×5 (rows), in which forty light-emitting sources are arranged two-dimensionally to emit light. FIG. 7 shows a partial view of one example arrangement of the surface light-emitting source 10a having forty light-emitting elements.

In an example embodiment, using the center of optical axis of the surface light-emitting source 10a as a pivot axis, the light source unit 200 as a whole can be slanted for the slanting amount γ, in which pitch "p" between beam spots on each of the photoconductors 30 in the sub-scanning direction is adjusted to a scan line pitch corresponding to a recording density, and forty lines can be simultaneously scanned on the photoconductor 30. When a sub-scanning magnification ratio of overall optical system of the optical scanning unit 100 is set as βs, the slanting amount γ can be expressed as below.

$$\sin \gamma = (\cos \gamma)/n = p/d \times \beta s$$

Such slanting amount γ for light-emitting elements can be set during manufacture of a vertical cavity surface emitting laser array by arranging the light emitting elements with a given direction with a given angle. Although the slanting amount can be set to a target value during manufacture, manufacturing precision of two-dimensional surface-emission laser array, a mechanical precision of the holder or the like to hold the light source, and tolerance of optical scanning system or the like may affect the slanting amount of the light emitting elements. To set the pitch between each of the light emitting elements with a high precision, an adjustment may be required when the light source unit 200 is to fit to the optical scanning unit 100 to set the slanting amount γ with a desired value.

Figure 8A:
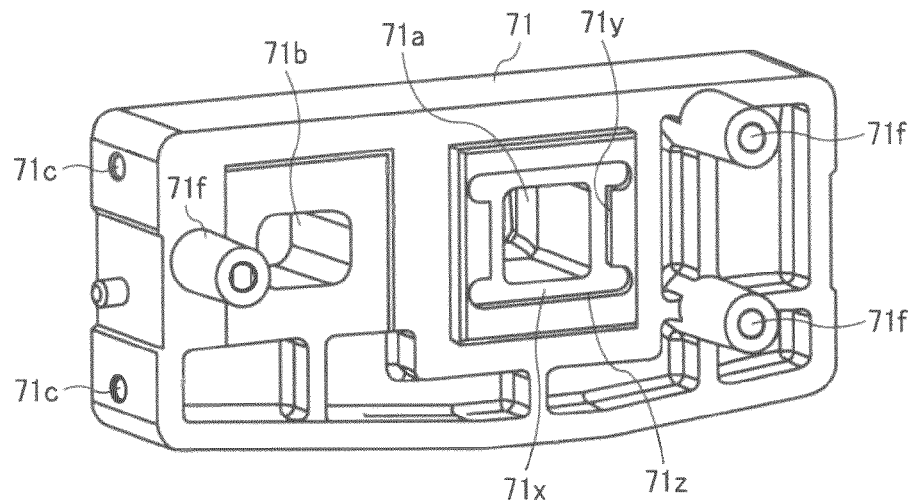
FIG. 8A shows a schematic perspective view of the intervening holder 71 viewed from the circuit base.
Figure 8B:
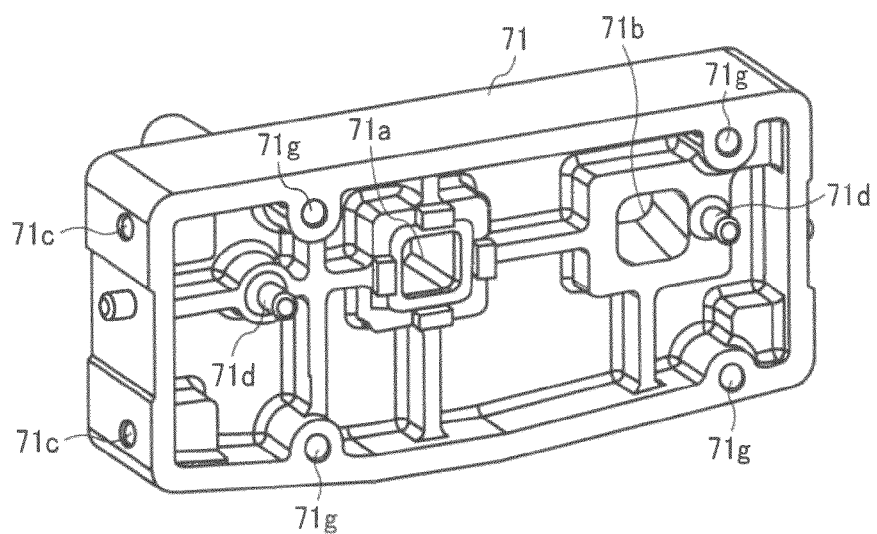
FIG. 8B shows a schematic perspective view of the intervening holder viewed from an optical element holder.

A description is given of the intervening holder 71 for the light source unit 200 with reference to FIG. 8. The intervening holder 71, disposed between the circuit base 75 and the optical element holder 72, may contact the light source device 10 (used as a surface light-emitting source), installed on the circuit base 75, to fix the light source device 10 in the light source unit 200 at a given position. FIG. 8 shows a schematic perspective view of the intervening holder 71, in which FIG. 8A shows a schematic perspective view of the intervening holder 71 viewed from the circuit base 75, and FIG. 8B shows a schematic perspective view of the intervening holder 71 viewed from the optical element holder 72.

The intervening holder 71 may be a metal block made of aluminum or the like, which may be shaped into a substantially rectangular block. Further, as shown in FIGS. 8A and 8B, the intervening holder 71 may include openings 71a and 71b. The opening 71a is used to pass through the light beam emitted from the light source device 10, and the opening 71b is used to pass through the monitor-use light flux to be guided to the circuit base 75. A frame may be disposed around the opening 71a to fit the light source device 10 installed on the circuit base 75. The frame may include an first abut portion 71x in the optical axis direction, and the first reference face 10x may be abutted to the abut portion 71x. Further, the second reference face 10y may be abutted to a second abut portion 71y for the main scanning direction disposed at a side of frame.

Further, the third reference face 10z is abutted to a third abut portion 71z for the sub-scanning direction disposed at a top and bottom of the frame. With such a configuration, the package 10b of the light source device 10 can be engaged or fit in the frame to position the light source device 10 at a given position.

Further, three cylindrical members 71f may be disposed around the openings 71a and 71b on one face of the intervening holder 71 facing the circuit base 75 as shown in FIG. 8A. Further, two holes 71c may be formed on both side faces of the intervening holder 71 to fit or fix reinforcement members 76a and 76b (see FIGS. 4 and 9) on the intervening holder 71. The reinforcement members 76a and 76b may be used to connect the circuit base 75 and the intervening holder 71.

A description is given of connection of the intervening holder 71 and the circuit base 75 with reference to FIG. 9. FIG. 9 shows a schematic perspective view of the intervening holder 71 and the circuit base 75 connected each other, which is viewed from the rear side of the circuit base 75.

When the package 10b of the light source device 10 is engaged to the frame of the intervening holder 71, the three cylindrical members 71f disposed for the intervening holder 71 can be fitted in hollow areas 75c (see FIG. 5) disposed on the circuit base 75 as shown in FIG. 9. Further, a package pressing unit 78 can press the package 10b toward the intervening holder 71 via the circuit base 75 from the rear side of circuit base 75. The package pressing unit 78, disposed at a rear face of the circuit base 75, opposite to a front face of the circuit base 75 disposed with the light source device 10, is fixed to the intervening holder 71 by screwing three screws 79c into the three cylindrical members 71f. The package pressing unit 78 may be formed as a plate having a given elasticity by conducting a plate processing, and may include a pressing member 78a having a given elasticity performance.

When the package pressing unit 78 is fixed to the intervening holder 71 by the screws 79c as shown in FIG. 9, the circuit base 75 can be pressed toward the intervening holder 71 by the pressing member 78a. With such screwing and fixing configuration of the package pressing unit 78, the first reference face 10x of the package 10b of the light source device 10 can be abutted to the first abut portion 71x of a frame of the intervening holder 71. Further, the second reference face 10y can be abutted to the second abut portion 71y, and the third reference face 10z can be abutted to the third abut portion 71z. With such a configuration, without causing too much stress to the circuit base 75, the surface light-emitting source 10a can be held at a given position. Further, the reinforcement members 76a and 76b, attached to the holes 71c disposed at both sides of the intervening holder 71 by a fixing member such as screw or the like, can be connected to the circuit base 75 using a fixing member such as screw or the like as shown in FIG. 9, by which the intervening holder 71 and the circuit base 75 can be connected each other. Further, when the intervening holder 71 and the circuit base 75 are connected each other, the light detector 17 disposed on the circuit base 75 (see FIG. 5) faces the openings 71b disposed on the intervening holder 71. The light detector 17 is positioned on the circuit base 75 as such so that the light detector 17 is aligned to the openings 71b.

A description is given of connection of the intervening holder 71 and the optical element holder 72 with reference to FIG. 10 in addition to FIG. 8B. FIG. 10 shows a schematic perspective view of the optical element holder 72 viewed from the side of intervening holder 71.

As shown in FIG. 8B, the intervening holder 71 may be provided with a reference pin 71d. The reference pin 71d can be inserted in a main reference hole 72d disposed for the optical element holder 72 (FIG. 10). Further, a fixing member such as screw or the like is inserted into four openings 72g, disposed at a peripheral area of the optical element holder 72, from the side of optical element holder 72, and further inserted and fixed in the holes 71g (FIG. 8B) on the intervening holder 71. With such a configuration, the intervening holder 71 and the optical element holder 72 can be held with a constant positional relationship.

With such a configuration, the optical configuration or system for the monitor-use light flux, which is used for guiding the monitor-use light flux to the light detector 17 using the reflecting mirror 14, the aperture member 15 and the converging lens 16, can be held with a constant positional relationship with the light detector 17.

Further, if the intervening holder 71 and the optical element holder 72 are configured using material and/or member having a same coefficient of linear expansion (i.e., coefficient of linear expansion has no difference), a fluctuation of position from the pre-determined positioning condition can be reduced. In an example embodiment, both of the intervening holder 71 and the optical element holder 72 may be made of, for example, aluminum alloy but not limited thereto.

As above described, the light source device 10 includes a plurality of light-emitting elements, the circuit base 75 holds the light source device 10 and the light detector 17. At least one optical element 11 is used to set the light beam emitting from the light source device 10 as a parallel light flux, a divergent light flux, or a convergent light flux. The optical element holder holds the optical element 11. The light-flux splitter 13 reflects the light to the light detector 17 with at least the reflecting mirror 14.

The light source unit 200 may integrally include the light source device 10, the light detector 17, the circuit base 75, the optical element 11, the light-flux splitter 13, and the reflecting mirror 14, and the light source unit 200 is fit to the optical scanning unit 100. With such a configuration, the positional relationship of the light source device 10, the coupling lens 11, the temperature-effect correcting lens 12, the light-flux splitter 13, the reflecting mirror 14, the aperture member 15, the converging lens 16, and the light detector 17 may not fluctuate when the position and/or angle adjustment of the light source unit 200 is conducted, and the pitch adjustment of scan lines formed on each of the photoconductors 30 can be conducted correctly.

Figure 11:
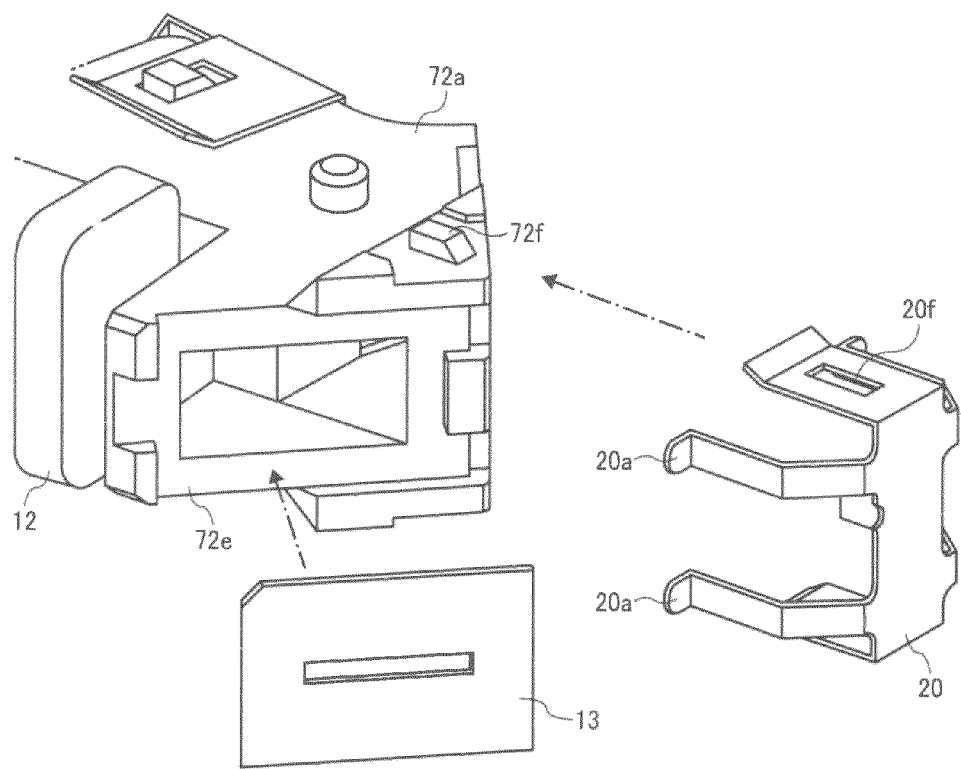
FIG. 11 shows a schematic expanded perspective view of a light-flux splitter holding member used for holding a light-flux splitter to the optical element holder.

A description is now given of configuration for fitting or attaching of the light-flux splitter 13 according an example embodiment with reference to FIG. 11. FIG. 11 shows a schematic perspective view of the light-flux splitter holding member 72a of the optical element holder 72, to which the light-flux splitter 13 can be attached. The light-flux splitter holding member 72a may include an attachment face 72e.

FIG. 11 shows a condition in which the light-flux splitter 13 is not yet attached or fit to the attachment face 72e. Specifically, the peripheral area of the light-flux splitter 13 may be abutted or attached to the attachment face 72e. Further, by pressing the non-reflecting face of the light-flux splitter 13, which is on the opposite side of the reflecting face of the light-flux splitter 13 used for reflecting the monitor-use light flux, and by using the pressing portion 20a such as a plate spring provided for the light-flux splitter pressing unit 20, the light-flux splitter 13 can be held on the attachment face 72e while the face of the light-flux splitter 13 conforms to the shape of the attachment face.

Further, when the pressing portion 20a of the light-flux splitter pressing unit 20 presses the non-reflecting face of the light-flux splitter 13, the pressing portion 20a may need to be set at a position that does not block a light path of the write-use light flux passing through the aperture of the light-flux splitter 13. Accordingly, the pressing portion 20a of the light-flux splitter pressing unit 20 is positioned where it does not block the aperture of the light-flux splitter 13.

Further, when the write-use light flux passes through the aperture of the light-flux splitter 13, some light reflected at a thick part of the light-flux splitter 13 may disturb the monitor-use light flux reflected at the reflecting face of the light-flux splitter 13. To reduce or prevent such disturbance to the monitor-use light flux, the light-flux splitter 13 is formed as a thin plate sheet of reduced thickness so that the disturbance can be ignored.

In an example embodiment, the light-flux splitter 13 may be a thin plate sheet having a given thickness such as 0.5 mm, and a rectangular shape having a given size such as 10 mm×15 mm. Further, such thin plate sheet can be available, for example, as MIRO (registered trademark) 2 or MIRO-SILVER (registered trademark) provided from ALANOD Aluminium-Veredlung GmbH & Co. KG. As for MIRO 2, the aluminum evaporation process is conducted on the reflecting face, and as for MIRO-SILVER, the silver evaporation process is conducted on the reflecting face. The MIRO-SILVER may have a reflectance higher than MIRO 2. Such MIRO-SILVER and MIRO 2 can be used selectively in view of the property of light source device 10 and the light detector 17, for example.

Further, because the thin plate sheet is sufficiently thin to allow the effects of disturbance of the monitor-use light flux to be ignored, the thin plate member has a rolling direction due to its very thin structure, which means the thin plate sheet may be warped in a given direction.

If the light-flux splitter 13 is disposed and used for the optical system adapted for the monitor-use light flux without correcting the warped condition, unfavorable effects may occur due to a fluctuation of tolerance of the light-flux splitter 13, which may occur during manufacture such as when the light-flux splitters 13 are mass-produced, in which not all of the light-flux splitters 13 may have a same warping level.

In the mass-production of image forming apparatuses, as for optical elements such as the light-flux splitter 13, which are manufactured in great numbers, warping of the light-flux splitter 13 may become greater than a given design value (i.e., radius of curvature becomes smaller) set for the manufactured light-flux splitters 13. If the light-flux splitter 13 having a greater warping level as a concave face is used for the optical system for the monitor-use light flux, the beam spot diameter of light beam to enter the light detector 17 may become greater than a design value, and some of the light beams emitted from a plurality of light-emitting elements in the light source device 10 may not enter the light detector 17 (not all light beams enter the light detector 17).

Further, in contrast, when the reflecting face has an opposite warping direction, that is when the reflecting face is a convex face, the beam spot diameter of light beams to enter the light detector 17 may become further greater, and then some of the light beams emitted from a plurality of light-emitting elements in the light source device 10 may not enter the light detector 17.

When either of the MIRO 2 or MIRO-SILVER is used, a metal evaporated face may become a concave face during manufacture, and therefore the reflecting face becomes a concave face, and the warping level may have a given radius of curvature such as 1000 mm R or more. If such MIRO 2 or MIRO-SILVER having the warping level such as 1000 mm R or more is employed, the above-mentioned concern over the warping can be eliminated. However, when the APC control is to be conducted more precisely, it is preferable that the reflecting face is set to an ideal plane as much as possible. Further, if a material other than MIRO 2 or MIRO-SILVER is used for the light-flux splitter 13, the warping level may not be within 1000 mm R or so, or the materials may be warped in the opposite direction. In view of such concern, it is preferable to maintain the light-flux splitter 13 as flat as possible. Further, the attachment face 72e to be attached with the light-flux splitter 13 can secure its flatness and face precision by conducting a given simple processing with a reduced cost.

Figure 12:
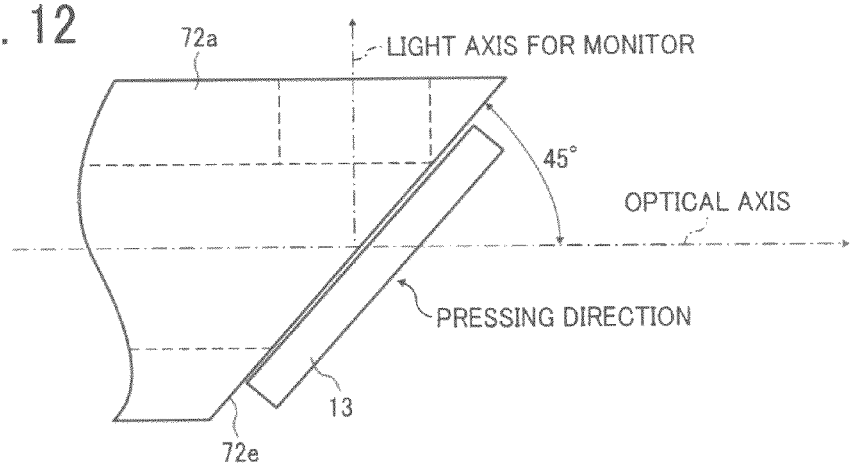
FIG. 12 shows a schematic cross-sectional view of the light-flux splitter held on the light-flux splitter holding member.

In an example embodiment, as shown in FIG. 12, the concave face of the light-flux splitter 13, which may be warped by making the light-flux splitter 13 thinner, may be used as the reflecting face, and a convex face provided at an opposite side of the reflecting face of the light-flux splitter 13 may be used as the non-reflecting face. The light-flux splitter 13 is pressed toward the light-flux splitter holding member 72a using the light-flux splitter pressing unit 20 including a plate spring or the like to hold the light-flux splitter 13.

FIG. 12 shows a cross-sectional view of the light-flux splitter holding member 72a and the light-flux splitter 13 held on the light-flux splitter holding member 72a. For the simplicity of description, the light-flux splitter pressing unit 20 is omitted from FIG. 12, in which the light-flux splitter 13 can be set as a flat face member.

Further, as above described, to make the warped light-flux splitter 13 conform to a flat face of the attachment face 72e, the light-flux splitter pressing unit 20 may press the non-reflecting face (or convex face) of the light-flux splitter 13. As such, the light-flux splitter pressing unit 20 may preferably presses a portion of maximum convexity of the non-reflecting face. By pressing the portion of maximum convexity of the non-reflecting face, the warped light-flux splitter 13 can be effectively conforms to the flat face of the attachment face 72e.

Further, when the light-flux splitter 13 is thinned to a thinner level that the warping may occur, the portion of maximum convexity on the non-reflecting face and the most concave portion on the reflecting face may occur at a substantially center portion of the light-flux splitter 13. Accordingly, the light-flux splitter pressing unit 20 may press the substantially center portion of the light-flux splitter 13.

With such a configuration, the warped light-flux splitter 13 can be disposed on the attachment face 72e and conform to the attachment face 72e, which can be easily processed as a flat face with a lower cost. Resultantly, the light-flux splitter 13 can be maintained as a flat member with a lower cost. Therefore, a deterioration of detection precision of monitor-use light flux reflected by the light-flux splitter 13, which may be warped in its production process, can be effectively minimized.

Figure 13:
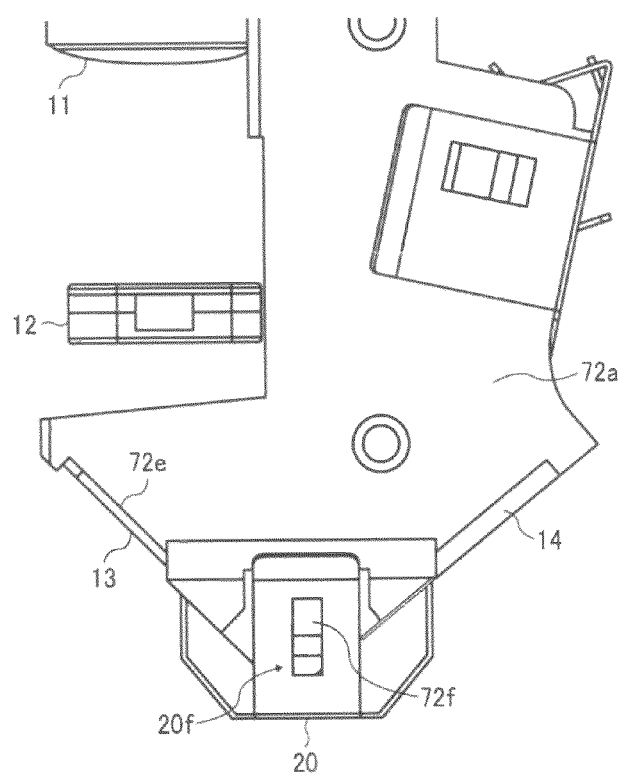
FIG. 13 shows a top view of a light source unit, in which the light-flux splitter is pressed and held by a pressing unit.
Figure 14:
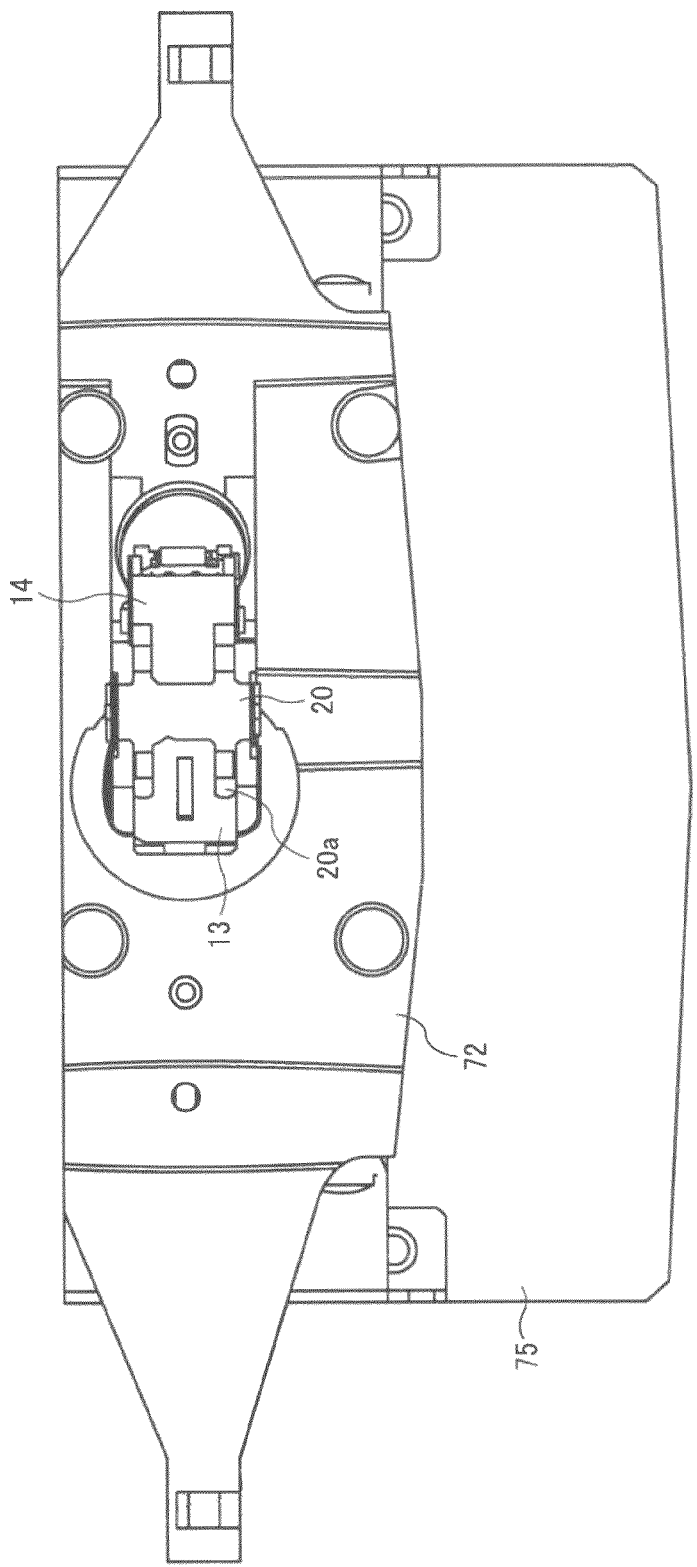
FIG. 14 shows a front view of the light source unit, in which the light-flux splitter is pressed and held by a pressing unit.
Figure 15:
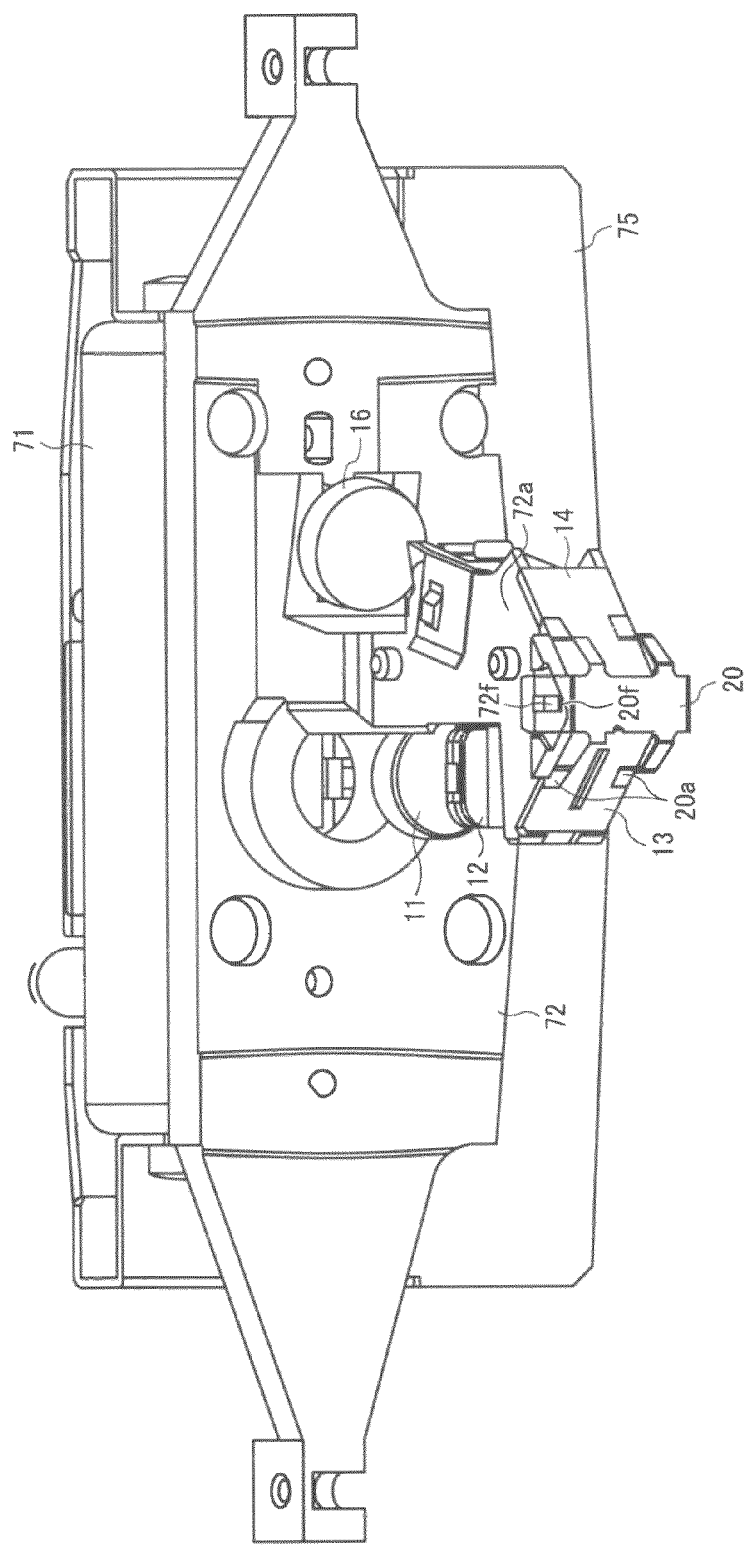
FIG. 15 shows a perspective view of the light source unit, in which the light-flux splitter is pressed held by a by a pressing unit.

FIGS. 13, 14 and 15 show the light source unit 200, in which the light-flux splitter 13 is pressed and held by the light-flux splitter pressing unit 20. FIG. 13 shows a top view of the light source unit 200 when the light-flux splitter 13 is pressed and held by the light-flux splitter pressing unit 20, FIG. 14 shows a front view of the light source unit 200 when the light-flux splitter 13 is pressed and held by the light-flux splitter pressing unit 20, and FIG. 15 shows a perspective view of the light source unit 200 when the light-flux splitter 13 is pressed and held by the light-flux splitter pressing unit 20.

FIG. 11 shows a condition in which the light-flux splitter 13 is to be held on the attachment face 72e of the light-flux splitter holding member 72a. From such condition, the light-flux splitter 13 is disposed on the attachment face 72e, and then the light-flux splitter pressing unit 20 is engaged to the light-flux splitter holding member 72a shown in FIGS. 13, 14, and 15, by which the light-flux splitter 13 can be held on the attachment face 72e while conforming to the attachment face 72e, which may be a flat face.

As shown in FIGS. 13, 14, and 15, a projection 72f is provided on the optical element holder 72 of the light source unit 200, and an engagement hole 20f is provided for the light-flux splitter pressing unit 20. By engaging the projection 72f into the engagement hole 20f of the light-flux splitter pressing unit 20, the light-flux splitter pressing unit 20 can effectively hold the light-flux splitter 13 while applying a pressing force.

Further, as shown in FIGS. 13, 14, and 15, the light-flux splitter pressing unit 20 can also hold the reflecting mirror 14 along with the light-flux splitter 13 simultaneously. The reflecting mirror 14 is used to reflect the monitor-use light flux, separated by the light-flux splitter 13, toward the light detector 17 disposed on the circuit base 75. With such simultaneous holding configuration, the number of parts can be preferably reduced.

Further, the light-flux splitter 13 may be made of a resin material, in which a reflecting face can be set on one face of the light-flux splitter 13 by conducting a metal evaporation process using a metal having a higher luminescence. In a case of using the resin material processed by the metal evaporation process, the resin material needs to be processed thinner, and further, the metal needs to be evaporated on the thin resin material, which may increase a manufacturing cost. Further, the thinner resin material may have greater warping compared to using a metal sheet for the light-flux splitter 13. The metal sheet may be cost effective and manufacturing effective material depending on a design of apparatus. The metal sheet or resin-based sheet may be selectively used depending on a design of apparatus.

In the above described embodiment, the light source unit 200 may include the light source device 10 having a plurality of light-emitting elements, the circuit base 75 to support the light source device 10 and the light detector 17, at least one optical element 11 to convert light beams emitting from the light source device 10 into a parallel light flux, a divergent light flux, or a convergent light flux, the optical element holder to hold the optical element 11, the light-flux splitter 13, and the reflecting mirror 14 to guide the light, reflected from the light-flux splitter 13, to the light detector 17. But the configuration for the light source unit 200 according an example embodiment is not limited thereto.

For example, the light detector 17 can be disposed on another circuit base while the light source device 10 is disposed on the circuit base 75, and in such configuration, the reflecting mirror 14 to guide the monitor-use light flux to the light detector 17 may be also disposed separately from the light source unit 200. Further, without using the reflecting mirror 14, the monitor-use light flux separated by the light-flux splitter 13 can be directly guided to the light detector 17 by disposing the light detector 17 at a given position.

Further, without disposing the light-flux splitter 13 in the light source unit 200, the light-flux splitter 13 can be disposed at a given position along the light path extending from the light source device 10 to the image bearing member 30.

The above described example embodiment can be employed for an optical scanning unit used for forming an electrostatic latent image on a surface of an image bearing member such as photoconductor. Specifically, the above described example embodiment can be employed for an optical scanning unit for a multi-beam scanning system which can form images at a high speed by simultaneously scanning a plurality of light beams using a light source having a plurality of light-emitting elements. Further, the above described example embodiment can be employed for an image forming apparatus disposed with an optical scanning unit.

In the above described example embodiment, the light-flux splitter may be formed as a thin plate, which may be thin to susceptible to warping. With such a configuration, the effect of disturbance to the reflected light used for the APC control, which may occur at a thicker part of light-flux splitter, can be effectively suppressed. Further, a concave face of the warped light-flux splitter is used as the reflecting face, and a convex face of the warped light-flux splitter is used as the non-reflecting face. The non-reflecting face is opposite side of the reflecting face, and the portion of maximum convexity of non-reflecting face is pressed by the pressing unit without blocking the aperture used for passing through the light beam, and the light-flux splitter holding member is used to hold the light-flux splitter. With such a configuration, the light-flux splitter having a warping due to its thinner thickness can be conformed to a flat face of light-flux splitter holding member that can be manufactured with a simpler method and higher precision, and the light-flux splitter can be held on the light-flux splitter holding member. Accordingly, the negative effect of warping of light-flux splitter to the detection precision of reflected light can be effectively minimized.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An optical scanning unit, comprising:
   a light source including a plurality of light-emitting elements;
   a light detector to detect a light beam emitted from the light source;
   a light-flux splitter disposed at an angle to the optical axis of the light beam emitted from the light source, having an aperture, a portion of reduced thickness susceptible to warping, a concave face of the warped light-flux splitter as a reflecting face, and a convex face of the warped light-flux splitter opposite the concave face as a non-reflecting face;
   a light-flux splitter holding member to hold the light-flux splitter thereon; and
   a light-flux splitter pressing unit to press the light-flux splitter held on the light-flux splitter holding member without blocking the aperture of the light-flux splitter,
   wherein a portion of light beam emitted from the light source passes through the aperture of the light-flux splitter as a write-use light flux for forming an electrostatic latent image on an image bearing member,
   the reflecting face of the light-flux splitter faces the light source in an optical path of the light beam emitted from the light source,
   the reflecting face of light-flux splitter reflects a light flux other than the write-use light flux as a monitor-use light flux for adjusting a light intensity of the light source, the monitor-use light flux being guided to the light detector,
   the light-flux splitter pressing unit presses a portion of maximum convexity of the non-reflecting face of the light-flux splitter held on the light-flux splitter holding member.

2. The optical scanning unit of claim 1, wherein the portion of maximum convexity of the light-flux splitter is a substantially center portion of the light-flux splitter.

3. The optical scanning unit of claim 1, wherein the light-flux splitter is made of a metal sheet.

4. The optical scanning unit of claim 1, wherein the aperture of the light-flux splitter is smaller than a diameter of the light beam emitted from the light source.

5. The optical scanning unit of claim 1, further comprising:
   a circuit base to support the light source and the light detector; and
   an optical system having at least one reflecting mirror to guide the monitor-use light flux reflected at the light-flux splitter to the light detector.

6. The optical scanning unit of claim 5, further comprising a light source unit that holds the light source having the plurality of light-emitting elements, wherein the light-flux splitter holding member is disposed in the light source unit.

7. The optical scanning unit of claim 6, wherein the light source unit integrally includes:
   the light source having the plurality of light-emitting elements;
   the circuit base to support the light source and the light detector;
   at least one optical element to convert light beam emitted from the light source as a parallel light flux, a divergent light flux, or a convergent light flux;
   an optical element holder to hold the at least one optical element; and
   the at least one reflecting mirror to guide the monitor-use light flux reflected at the light-flux splitter to the light detector.

8. The optical scanning unit of claim 7, wherein the light-flux splitter pressing unit simultaneously holds the light-flux splitter and the reflecting mirror.

9. An image forming apparatus comprising the optical scanning unit of claim 1.

10. A light source unit useable for an optical scanning unit, comprising:
    a light source having a plurality of light-emitting elements;
    a light detector to detect light emitted from the light source;
    a circuit base to support the light source and the light detector;
    at least one optical element to convert light beam emitting from the light source as a parallel light flux, a divergent light flux, or a convergent light flux;
    an optical element holder to hold the at least optical element to convert the light beam;
    a light-flux splitter disposed at an angle to the optical axis of the light beam emitted from the light source, having an aperture, a portion of reduced thickness susceptible to warping, a concave face of the warped light-flux splitter as a reflecting face, and a convex face of the warped light-flux splitter opposite the concave face as a non-reflecting face;
    a light-flux splitter holding member to hold the light-flux splitter thereon; and
    a light-flux splitter pressing unit to press the light-flux splitter held on the light-flux splitter holding member without interfering with the aperture of light-flux splitter,
    wherein a portion of light beam emitted from the light source passes through the aperture of the light-flux splitter as a write-use light flux for forming an electrostatic latent image on an image bearing member,
    the reflecting face of the light-flux splitter faces the light source in an optical path of the light beam emitted from the light source,
    the reflecting face of light-flux splitter reflects a light flux other than the write-use light flux as a monitor-use light flux for adjusting a light intensity of the light source, the monitor-use light flux being guided to the light detector,
    the light-flux splitter pressing unit presses a portion of maximum convexity of the non-reflecting face of the light-flux splitter held on the light-flux splitter holding member.

11. The light source unit of claim 10, wherein the light-flux splitter pressing unit simultaneously holds the light-flux splitter and the reflecting mirror.

12. The optical scanning unit of claim 1, wherein the light-flux splitter comprises a thin planar sheet having a thickness of approximately 0.5 mm and a rectangular shape of approximately 10 mm×15 mm.

13. The optical scanning unit of claim 1, wherein the light-flux splitter pressing unit comprises a plate spring.

14. The optical scanning unit of claim 1, wherein the light-flux splitter is disposed at an angle of approximately 45 degrees to the optical axis of the light beam emitted from the light source.

* * * * *